(12) United States Patent
Gupta

(10) Patent No.: US 6,775,679 B2
(45) Date of Patent: Aug. 10, 2004

(54) BUILDING A META FILE SYSTEM FROM FILE SYSTEM CELLS

(75) Inventor: Uday K. Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 486 days.

(21) Appl. No.: 09/812,740

(22) Filed: Mar. 20, 2001

(65) Prior Publication Data

US 2002/0138502 A1 Sep. 26, 2002

(51) Int. Cl.[7] .............................................. G06F 17/30
(52) U.S. Cl. ...................................... 707/102; 711/1
(58) Field of Search ............................ 707/102; 711/1

(56) References Cited

U.S. PATENT DOCUMENTS

| | | | |
|---|---|---|---|
| 4,577,272 A | 3/1986 | Ballew et al. .............. 364/200 |
| 5,175,852 A | 12/1992 | Johnson et al. ............ 395/600 |
| 5,367,671 A * | 11/1994 | Feigenbaum et al. .......... 707/1 |
| 5,367,698 A | 11/1994 | Webber et al. .............. 395/800 |
| 5,495,607 A * | 2/1996 | Pisello et al. ................. 707/10 |
| 5,537,588 A | 7/1996 | Engelmann et al. ........ 395/600 |
| 5,544,313 A | 8/1996 | Shachnai et al. ...... 395/200.01 |
| 5,566,328 A * | 10/1996 | Eastep ........................ 707/102 |
| 5,590,320 A | 12/1996 | Maxey ........................ 395/619 |
| 5,640,501 A * | 6/1997 | Turpin ........................ 715/507 |
| 5,644,736 A * | 7/1997 | Healy et al. ................ 345/784 |
| 5,737,747 A | 4/1998 | Vishlitzky et al. .......... 711/118 |
| 5,740,422 A | 4/1998 | Foltz et al. .................. 395/609 |
| 5,754,848 A * | 5/1998 | Hanes ........................ 707/200 |
| 5,774,660 A | 6/1998 | Brendel et al. ........ 395/200.31 |
| 5,819,296 A * | 10/1998 | Anderson et al. ........... 707/204 |
| 5,884,298 A * | 3/1999 | Smith et al. .................... 707/2 |
| 5,893,140 A | 4/1999 | Vahalia et al. .............. 711/118 |
| 5,944,789 A * | 8/1999 | Tzelnic et al. .............. 709/214 |
| 5,987,621 A | 11/1999 | Duso et al. ..................... 714/4 |
| 5,991,771 A * | 11/1999 | Falls et al. .................. 707/202 |
| 5,991,793 A | 11/1999 | Mukaida et al. ............ 709/104 |
| 6,003,047 A | 12/1999 | Osmond et al. ............. 707/513 |
| 6,044,444 A | 3/2000 | Ofek ........................... 711/162 |
| 6,192,408 B1 | 2/2001 | Vahalia et al. .............. 709/229 |
| 6,230,200 B1 * | 5/2001 | Forecast et al. ............ 709/226 |
| 6,269,431 B1 | 7/2001 | Dunham ..................... 711/162 |
| 6,275,953 B1 | 8/2001 | Vahalia et al. ................ 714/11 |
| 6,298,390 B1 * | 10/2001 | Matena et al. .............. 709/315 |
| 6,324,581 B1 | 11/2001 | Xu et al. ..................... 709/229 |
| 6,353,878 B1 | 3/2002 | Dunham ..................... 711/163 |
| 6,421,711 B1 | 7/2002 | Blumenau et al. .......... 709/213 |
| 6,448,985 B1 * | 9/2002 | McNally ..................... 345/784 |
| 6,453,354 B1 * | 9/2002 | Jiang et al. ................. 709/229 |
| 6,499,039 B1 | 12/2002 | Venkatesh et al. .......... 707/204 |
| 6,571,259 B1 * | 5/2003 | Zheng et al. ............... 707/205 |
| 6,625,750 B1 | 9/2003 | Duso et al. ................... 714/11 |
| 2002/0103779 A1 * | 8/2002 | Ricart et al. .................... 707/1 |

OTHER PUBLICATIONS

Computer Dictionary, Third Edition, 1997, Microsoft Press, Microsoft Corporation, Redmond, WA 98052 pp. 231–232.

(List continued on next page.)

*Primary Examiner*—Wayne Amsbury
(74) *Attorney, Agent, or Firm*—Howrey Simon Arnold & White LLP

(57) ABSTRACT

File system cells are linked together to form a meta file system that appears to a user or application program to be a single file system. Each file system cell may have a conventional file system format, and can be indistinguishable from a conventional file system except for information, such as directory entry attributes, indicating one or more links to other file system cells. These external links may include direct links that are hidden from the user or application program and define a hierarchy of the meta file system cells, and indirect links that appear in the user-visible file system. The meta file system substantially reduces crash recovery time because each file system cell functions as a consistency unit that can be repaired only if needed. The meta file system also permits the file system cells to be accessed concurrently by multiple processors in a file server.

44 Claims, 9 Drawing Sheets

OTHER PUBLICATIONS

File System, Free Online Dictionary of Computing, Editor Denis Howe, Imperial College Department of Computing, London, England, SW7 2AZ, wombat .doc.ic.ac.uk, Oct. 14, 2003.

Mount(8)—Linux man page, die.net, Sep. 23, 2003, 14 pages.

Glen Fowler, AST Manual, ast_mount(1), 1998–2003, AT&T Corp., akpublic.research.att.com, 2 pages.

Matloff, Norman, File Systems in Unix, Department of Computer Science, University of California at Davis, heather.cs.ucdavis.edu, Oct. 19, 1998, 5 pages.

Request for Comments ("RFC") 1094, Sun Microsystems, Inc., "*NFS: Network File Systems Protocol Specification,*" Mar. 1989 (23 pages).

Paul L. Leach and Dilip C. Narik, "*A Common Internet File System,*" Microsoft Corporation, Dec. 19, 1997 (121 pages).

Uresh Vahalia, *UNIX internals: the new frontiers, Chapter 9, "File System Implementations,"* Prentice–Hall, Inc., Upper Saddle River, New Jersey, 1996, pp. 261–289.

Peter Norton and Richard Wilton, *The New Peter Norton Programmer's Guide To The IBM PC & PS/2*, Chapter 5 Disk Basics, Microsoft Press, Redmond, Washington, 1988, pp. 99–123.

Brian W. Kernighan and Rob Pike, *The UNIX Programming Environment*, Chapter 2, The File System, Prentice–Hall, Inc., Englewood Cliffs, NJ 07632, pp. 41–70, 122–124.

Philip Trautman and Jim Mostek, *Scalability and Performance in Modern File Systems*, http://oss.sgi.com/projects/xfs/papers/xfs_white/xfs_white.html, published at least as early as Oct. 28, 2000, pp. 1–21.

P. Venkat Rangan and Harrick M. Vin, *Designing File Systems for Digital Video and Audio*, Multimedia Laboratory, Department of Computer Science & Engineering, University of California, San Diego, La Jolla, CA, pp. 81–94.

David P. Anderson, Yoshitomo Osawa, and Ramesh Govindan, *A File System for Continuous Media*, ACM Transactions on Computer Ssytems, vol. 10, No. 4, pp. 311–336.

"Filesystem *Manager*—VxFS" http://www.fujitsu–computers.com/Servers/software/ds–mgw–12.html, published at least as early as Oct. 28, 2000, 2 pages.

"VERITAS Volume Manager" http://www.sun.com/stor.../volumemgr.html;$sessionid$QUEOQTDQAAC2QHAMTA1FU5Y, published at least as early a Oct. 28, 2000, 3 pages.

"VERITAS NetBackup and Storage Migrator" http://www.sun.com/stora.../netbackup.html;$sessionid$QEOQTDQAAC2QHAMTA1FU5Y, published at least as early as Oct. 28, 2000, 5 pages.

"Veritas File System, System Administrator's Guide," Release 3.2, Veritas Software Corporation, Introduction, Index, Performance and Tuning (Chapter 5), fsadm_vxfs(1M)—resize or reorganize a Veritas File System (http://uw7doc.sco.com/ODM_FSadmin/fssag–1.html, fssag–13.html, fssag–8.html, and http://uw7doc.sco.com/cgi–bin/man/man?fsadm_vxfs+1M) published at least as early as Oct. 28, 2000, 31 pages total.

* cited by examiner

BUILDING A META FILE SYSTEM FROM FILE SYSTEM CELLS

BACKGROUND OF THE INVENTION

1. Field of the Invention

The present invention relates generally to data storage, and specifically to file systems.

2. Description of Related Art

Files are typically stored on disk in a hierarchical data structure called a file system. The file system includes a root directory and objects such as files, links, and subdirectories. The hierarchical arrangement was popularized in the UNIX operating system, and was also adopted in the Microsoft MS-DOS operating system for personal computers. The hierarchical arrangement survives today in various UNIX-based file systems, the Microsoft Windows operating system, and many other operating systems. Popular UNIX-based file systems are the UNIX file system (ufs), which is a version of Berkeley Fast File System (FFS) integrated with a vnode/vfs structure, and the System V file system (s5fs). The implementation of the ufs and s5fs file systems is described in Chapter 9, pp. 261–289 of Uresh Vahalia, *Unix Internals: The New Frontiers*, 1996, Prentice Hall, Inc., Simon & Schuster, Upper Valley River, N.J. 07458. The implementation of the MS-DOS file system is described in Chapter 5, pp. 99–123 of Peter Norton & Richard Wilton, *The New Peter Norton Programmer's Guide to The IBM PC & PS/2*, 1988, Microsoft Press, Redmond, Wash. 98073.

One goal of operating system programmers is to relieve application programmers from dealing with problems introduced by the way that files are stored in physical storage devices such as disk drives. In the early development of Unix, for example, application prograrnmers had to deal with the problem that common storage devices were relatively expensive, and removable storage media was typically used to reduce storage costs. The file system was divided into subsystems, each including at least a respective root directory, which in turn could include subdirectories and files. The subsystems were stored in respective units of removable storage media, such as disk packs. The subsystems would be attached, or "mounted," into the file system when the operating system found the removable storage media to be installed in a storage device. Upon request of an application program, the operating system would provide a report of the subsystems presently mounted to the file system. The user or application programmer had to deal with processing delays due to the physical installing and removing of the removable storage. The user or application programmer was prohibited from linking a file in one file system to a file in another file system. Each subsystem also had fixed upper limits on the size of the subsystem.

Continuing advances in storage technology have reduced the cost of storage devices to such an extent that removable storage is becoming obsolete for network storage applications other than archival storage. A network storage system can provide a very large capacity of storage at low cost using a redundant array of inexpensive magnetic disk drives. Such a network storage system may include at least 20 terabytes (TB) of data storage. Further details regarding such a high-capacity network storage system are found in Vahalia et al., U.S. Pat. No. 5,893,140, issued Apr. 6, 1999, and entitled "File Server Having A File System Cache And Protocol For Truly Safe Asynchronous Writes," incorporated herein by reference.

The increase in capacity of network file servers has permitted application programmers to increase the size of the file systems up to at least 100 gigabytes. Such a large file system, however, presents a problem for crash recovery. In order to recover from a system crash, the file system must be checked for consistency. The file system may not be consistent because all of the file system updates may not have been written from the file system cache to disk. In this case, however, the file system updates may be recoverable from a log file, and used to repair the file system. Unfortunately, the process of checking and repairing a very large file system after a system crash may take hours.

SUMMARY OF THE INVENTION

In accordance with one aspect, the invention provides a method of building a meta file system. The method includes selecting a file subsystem in a first file system cell, and removing the selected file subsystem from the first file system cell, converting the selected file subsystem into a second file system cell, and inserting a link in the first file system cell from a directory entry for the selected file subsystem to a root directory of the second file system cell.

In accordance with another aspect, the invention provides a meta file system contained in data storage. The meta file system includes a multiplicity of file system cells linked in a hierarchy by direct links in the file system cells, the direct links being hidden from a user or application program in such a way that the hierarchy appears to the user or application program as a single file system. In accordance with yet another aspect, the invention provides a method of operating a network file server to provide users in the network with concurrent access to objects in a user-visible file system. The objects are distributed over a plurality of file system cells in data storage of the network file server. The network file server has a plurality of data mover computers for responding to users requesting access to the data storage. The method includes configuring the data mover computers so that each data mover computer has exclusive management of access to a respective subset of the file system cells. When each data mover computer receives a user request for access to an object in the uservisible file system, the data mover computer directs the request to the data mover computer that has exclusive management of access to a respective one of the file system cells containing the object.

In accordance with a final aspect, the invention provides a program storage device containing a program executable by a network file server. The network file server is adapted for coupling to at least one client for access of the client to a user-visible file system in storage in the network file server. Objects in the user-visible file system are contained in a plurality of file system cells. The program includes a meta file system manager for receiving file system access calls intended for a file system manager, and the meta file system manager is executable for acting as an intermediary between the client and the file system manager in order to follow hidden links between the file system cells so that the file system cells appear to the client as one file system.

BRIEF DESCRIPTION OF THE DRAWINGS

Other objects and advantages of the invention will become apparent upon reading the detailed description with reference to the drawings, in which.

Figure 1:
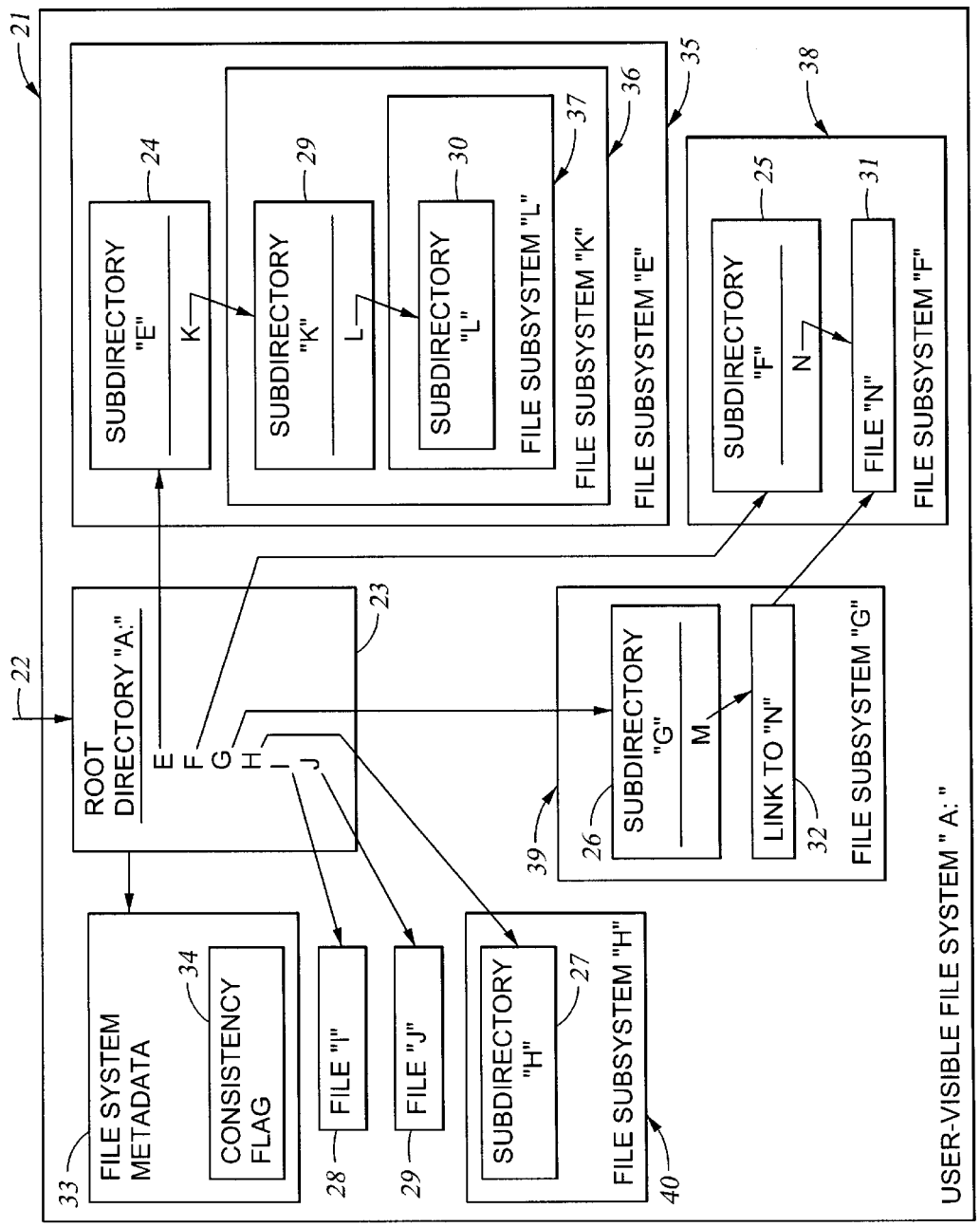
FIG. 1 is a block diagram of a file system as seen by a user or application program.

While the invention is susceptible to various modifications and alternative forms, a specific embodiment thereof has been shown by way of example in the drawings and will be described in detail. It should be understood, however, that it is not intended to limit the form of the invention to the particular form shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a block diagram of a file system 21 as seen by a user or application program. The file system is a hierarchy of data objects such as directories, files, and links. The data objects reside in logical blocks of data storage. Typically a contiguous range of logical block numbers of data storage is allocated to store the file system objects and additional objects that might be added to the file system.

Typically a user or application program accesses an object in the file system by providing a path name for the object. Given the path name, an operating system program known as a file system manager searches the file system hierarchy for the specified object. The file system manager accesses the file system from an entry point 22, which is the beginning of a root directory 23 named "A:".

The root directory has a list of directory entries, each of which points to a file system object. Each entry, for example, includes a name of the object pointed to by the entry, and an object type attribute indicating whether the object is a subdirectory, a file, or a link. For example, the root directory 23 lists a subdirectory 24 named "E", a subdirectory 25 named "F", a subdirectory 26 named "G", a subdirectory 27 named "H", a file 28 named "I", and a file 29 named "J". Each subdirectory may also list subdirectories, files, and links. For example, the subdirectory 24 named "E" lists a subdirectory 29 named "K", and the subdirectory named "K" lists a subdirectory 30 named "L". The subdirectory 25 named "F" lists a file 31 named "N". The subdirectory 26 named "G" lists a link 32 named "N". The link 32 includes a pointer to the file 31 named "N".

The file system 21 also includes file system metadata 33 including attributes of the file system itself, such as a volume label, and ownership and access permissions, and various date-time stamps indicating when the file system was last accessed, backed up, defragmented, and checked for errors. The file system metadata 33 also state information used by the operating system for maintaining consistency of the file system during read-write operations and for recovery of the file system after a system crash. Typically, before or after images of updated portions of the file system are written to a log file, and then the updates are written to the file system. If a crash occurs during the time that the updates are written to the file system, then the log file must be used to recover the file system to a consistent state. The file system metadata may include a consistency flag 34 indicating whether or not an update of the file system is in progress. In other words, the flag is set at the beginning of the update task, and cleared at the end of the update task. Alternatively, an indication of whether or not an update of the file system is in progress can be written into the log file. In any case, recovery from a system crash typically involves inspecting the file system or the log in storage to determine whether or not it is possible for the file system to be in an inconsistent state, and if it is possible for the file system to be in an inconsistent state, then the entire file system is scanned to check and correct for any inconsistency between the file system and the log.

The fact that conventional file system managers and crash recovery programs treat the file system as a "consistency block" has caused problems for crash recovery of large file systems. Users normally enjoy benefits from large file systems, because they are easier to manage and easier to back up than a larger number of smaller file systems. When a system crash occurs, however, it may take hours to repair a file system larger than 100 gigabytes. Because file system size limits have increased to at least 800 gigabytes, and users more frequently add rather than delete new data and new files, users and system administrators may not be prepared for the delay that should be expected for recovery from a system crash.

The present invention solves the problem of large file systems by recognizing that it is possible for users, and application programs such as backup programs, to have a view of the file system that is different from the file system organization seen by the operating system and crash recovery programs. The user and application programs can see one very large file system, and the operating system and crash recovery programs can see a collection of smaller file systems that include all of the objects in the one very large file system. Because file systems traditionally have been managed at the operating system level, the smaller file systems will be considered as real file systems, and the collection of file systems seen by the user as one file system will be referred to as a "meta file system." The file systems in the meta file system will be referred to as "file system cells." The present invention also provides a meta file system manager in the operating system for permitting users and application programs to access the meta file system as if the meta file system were one large conventional file system.

The file system of FIG. 1 could be broken down into file system cells in various ways. Specifically, each subdirectory in the file system 21 is a directory of a file subsystem in the file system 21. As shown in FIG. 1, the file system 21 includes a file subsystem 35 named "E", a file subsystem 36 named "K", a file subsystem 37 named "L", a file subsystem 38 named "F", a file subsystem 39 named "G", and a file subsystem 40 named "H". Each of these file subsystems could become a file system cell in a meta file system having the same appearance to a user or application program as the file system 21 shown in FIG. 1.

Figure 2:
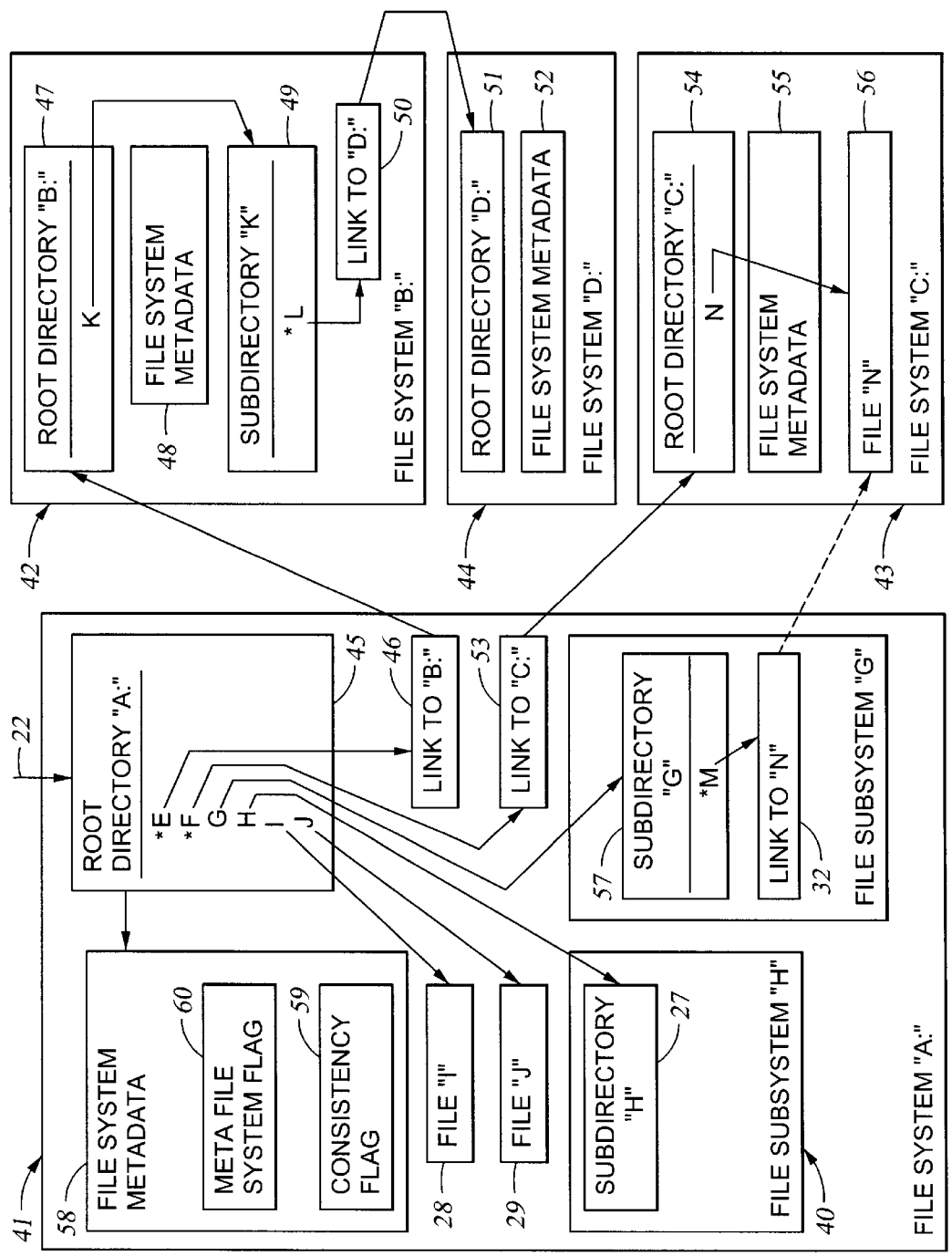
FIG. 2 is a block diagram of a meta file system in accordance with the invention for implementing the user-visible file system of FIG. 1.

With reference to FIG. 2, there is shown a specific example of a meta file system having the same appearance to the user or application program as the file system of FIG. 1. As shown in FIG. 2, the file system cells of the meta file system consist of a file system 41 named "A-", a file system 42 named "B:", a file system 43 named "C:", and a file system 44 named "D:" The root directory 45 named "A:" in FIG. 2 is similar to the root directory 23 named "A:" in FIG. 1 to the extent that it has entries including object names E, F, G, H, I, and J. In the directory 45 named "A:" in FIG. 2, however, the objects named "E" and "F" have become external links to the root directories 47 and 54 of the file systems 42 and 43 named "B:" and "C:", respectively. For example, each of the entries in the root directory 45 named "A:" has an attribute flag (shown as an asterisk) indicating to the meta file system manager whether or not the entry is for an external link. The root directory entry containing the name "E" points to an external link 46 to the file system cell named "B:", and the root directory entry containing the name "F" points to an external link 53 to the file system cell 43 named "C:" The external links 46 and 53, for example, are files that are hidden from the view of the user or application program, so that they do not appear to the user or application program be files in the root directory 45. Moreover, to the user or application program, the directory 47 named "B:" and the directory 54 named "C:" appear to be subdirectories, and not root directories. Such external links, which are hidden from the view of the user or application program and which link the file system cells to form the meta file system hierarchy, will be referred to as "direct external links."

The subdirectory 57 named "G" in the meta file system of FIG. 2 is similar to the subdirectory 26 named "G" in the file system of FIG. 1 except that the entry named "M"in the subdirectory 57 named "G" in the meta file system has an attribute flag (shown as an asterisk in front of the M) set to indicate that the entry named "M" is for an external link. This subdirectory entry named "M" points to a link 32 to the file 56 named "N", which appears in the file system cell 43 named "C:". In this case, the link 32 is not hidden from the user or application. Such a user-visible external link will be referred to as an "indirect external link."

The file system cells themselves may have a hierarchical arrangement. For example, the file system cell 42 named "B:" has a subdirectory 49 named "K" including the entry containing the name "L" pointing to an external link 50 to the root directory 51 of the file system cell 44 named "D:". Each of the file system cells in the meta file system cell hierarchy includes respective file system meta data 58, 48, 52, 55.

The original file system 21 named "A:" has become a file system cell 41 named "A:" in the meta file system of FIG. 2. It is desired that the file system cell "A:" and the other file system cells comply with the conventional format of a file system. In this case, the links in an original file system must be converted to external links that do not cause errors when interpreted by a conventional file system manager. In a UNIX-based file system, for example, a link in an original file system includes a pointer to an inode of the target object. If the target object has been moved to another file system cell, then this pointer will be invalid. Nor can the pointer simply be changed to point to a new inode for the target, because the pointer values are inode numbers that are local to each file system. Therefore, it may be desirable to put any link in the original file system into a form that is recognized by the conventional file system manager as an empty target, so that the conventional file system manager will not attempt to access a target for the link. Nevertheless, an external link needs to contain something that can be interpreted by the meta file system manager as a pointer to the new location of the target in the new file system cell. Preferably this pointer is not in the form of a logical block number or inode number in the new file system cell, because then the logical block number or inode number of the target may change if and when the new file system cell is reorganized. The new file system may be reorganized, for example, by converting a file subsystem containing the target object into a new file system cell.

One solution to the problem of links in the user-visible file system is to use the user-visible pathname of the target object as the target object specification in any external link converted from an internal link appearing in the user-visible file system. For example, the link 32 to the file named "N" in FIG. 2 would include the user-visible pathname "A:\F\N." Therefore, the target object specification need not be changed in response to any reorganization of the meta file system that does not affect the user-visible file system. Nevertheless, the use of the user-visible pathname for the target object specification will introduce some search delay for finding the target, and therefore the liberal use of links in the user-visible path specification should be discouraged.

In contrast, the direct external links (such as links 46 and 53 in FIG. 2) that are created during meta file system creation or reorganization may contain a target specification that is simply the name of the new file system cell (such as "B:" or "C:" for the respective external links 46 and 53). Although these file system cell names are invisible to the user or application, they define the meta file system hierarchy and therefore should be maintained by appropriate modification if and when they would be affected by any file system reorganization.

Due to the use of external links in the file system cells of the meta file system, it is desirable to include a meta file system flag (such as the flag 60 in the file system metadata 58) in the file system metadata of any file system cell that includes external links. In the meta file system of FIG. 2, for example, the meta file system flag 60 is set, a similar flag (not shown) in the file system metadata 48 is set, a similar flag (not shown) in the file system metadata 52 is not set, and a similar flag in the file system metadata 55 is not set. When set, such a meta file system flag would indicate that access of the file system cell with a conventional file system manager may result in unexpected behavior or a report of an empty link. For example, an attempted execution or access of the link file could result in an immediate return or a user message "target not found." If the user or application would desire to access the target objects of the external links, then the file system cell should be accessed with a meta file system manager, as further described below with reference to FIGS. 4 to 7.

Figure 3:
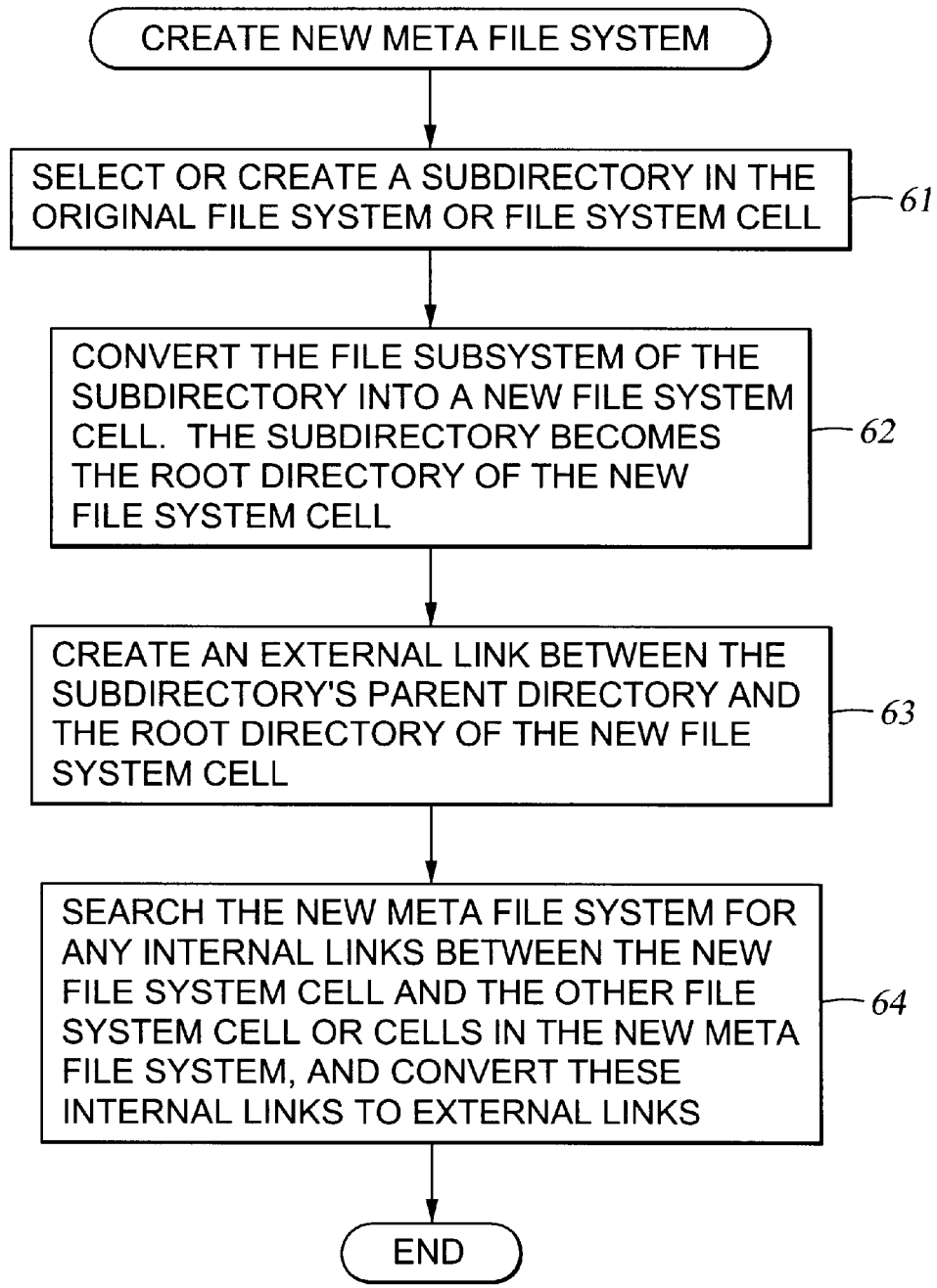
FIG. 3 is a flow chart of a procedure for creating a new meta file system from an original file system or an original meta file system.

With reference to FIG. 3, there is shown a flowchart of a procedure for creating a new meta file system from an original file system or from an original meta file system. In a first step 61, a subdirectory is selected or created in the original file system or in a file system cell of the original meta file system. Next, in step 62, the file subsystem of the selected subdirectory is converted into a new file system cell. The subdirectory becomes the root directory of the new file system cell. In step 63, an external link is created between the subdirectory's parent directory and the root directory of the new file system cell. This external link is placed at the same level in the hierarchy of the meta file system as subdirectory's parent directory. Finally, in step 64, the new meta file system is searched for any internal links between the new file system cell and the other file system cell or cells in the new meta file system. If any such internal link is found, it is converted to an external link.

Figure 4:
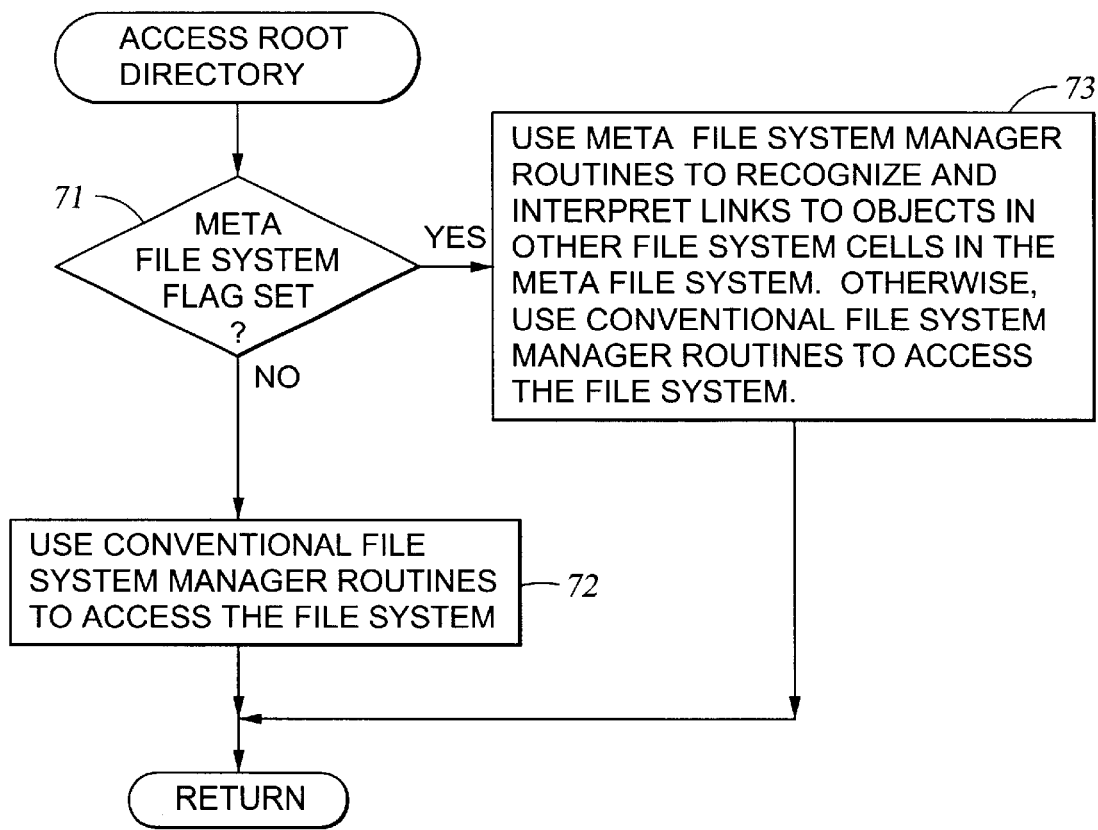
FIG. 4 is a flow chart of a meta file system manager routine for accessing a root directory of a file system cell in the meta file system of FIG. 2.

With reference to FIG. 4, there is shown a flowchart of a routine in a meta file system manager for accessing the root directory of a file system cell. In a first step 71, the meta file system manager inspects the file system meta data to determine whether the meta file system flag is set. If the meta file system flag is not set, then execution continues to step 72 to use conventional file system manager routines to access the file system. Otherwise, if the meta file system flag is set, then execution branches from step 71 to step 73. In step 73, the meta file system manager uses some special routines to recognize and interpret external links to objects in other file system cells in the metafile system. Otherwise, the metafile system manager uses conventional file system manager routines to access the file system.

Figure 5:
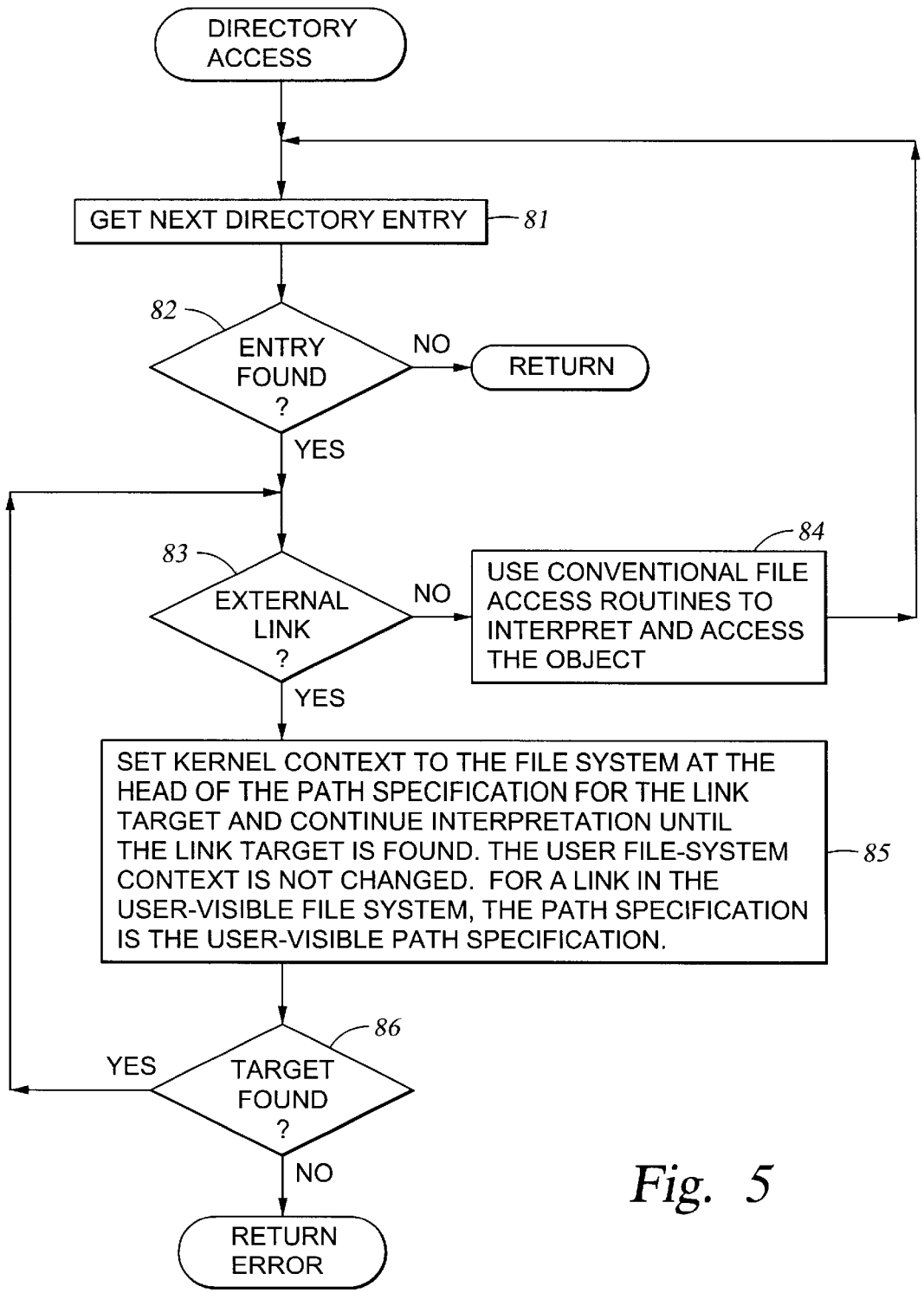
FIG. 5 is a flow chart of a meta file system manager routine for accessing a directory in a file system cell having external links.

With reference to FIG. 5, there is shown a flow chart of a meta file system manager routine for accessing a directory in a file system cell having external links. In a first step 81, the meta file system manager obtains the next entry in the directory. If an entry is not found, as tested in step 82, execution returns. Otherwise, execution continues from step 82 to step 83. In step 83, the meta file system manager checks an attribute for the directory entry to determine whether the directory entry points to an external link. If not, then execution branches from step 83 to step 84 to use conventional file access routines of a conventional file system manager to interpret and access the object. After step 84, execution loops back to step 81.

If in step 83 the meta file system manager determines that the directory entry is for an external link, execution continues from step 83 to step 85. In step 85, the meta file system manager sets the kernel context to the file system at the head of the path specification for the link target and continues interpretation of the path specification until the link target is found in the meta file system. The user file system context, however, is not changed. For a link in the user-visible file system, the path specification is the uservisible path specification. Otherwise, for a direct link that does not appear in the uservisible file system, the path specification is simply the root directory name for another file system cell.

After step 85, execution continues to step 86. In step 86, if a target is not found, then an error message is returned. Otherwise, execution loops back from step 86 to step 83, to test whether the target is itself an external link. Execution then continues until all of the entries in the directory have been accessed, or until step 84 terminates directory access before all of the entries in the directory have been accessed.

Figure 6:
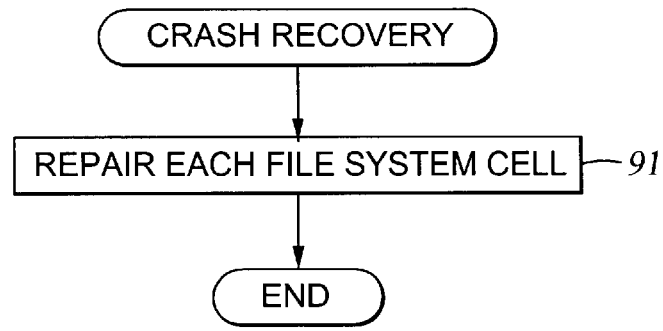
FIG. 6 is a flow chart of a meta file system manager routine for crash recovery of a meta file system.

With reference to FIG. 6, there is shown a flowchart of a meta file system manager routine for crash recovery of a meta file system. In step 91, the metafile system performs a repair of each file system cell in the meta file system. For example, the meta file system manager scans a list of the file system cells in the meta file system. For each file system cell, the meta file system manager calls a repair subroutine as shown in FIG. 7.

Figure 7:
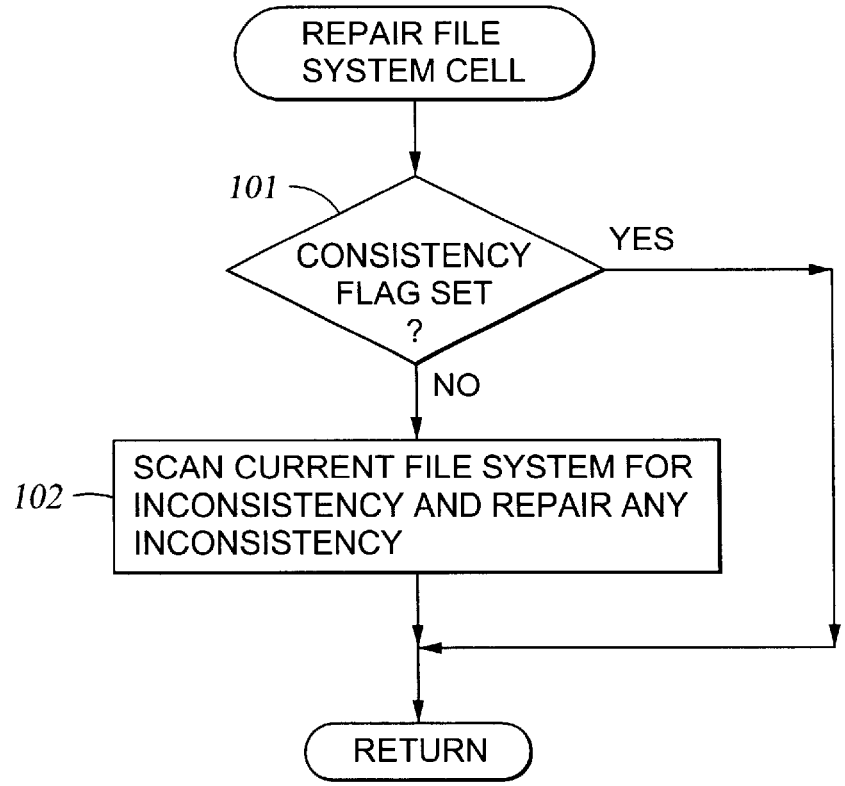
FIG. 7 is a flow chart of a meta file system manager routine for crash recovery of a specified file system.

In the repair subroutine of FIG. 7, the meta file system manager inspects the file system metadata for the file system cell to be repaired. If the consistency flag is set, as tested in step 101, then the subroutine is finished, and execution returns. Otherwise, execution continues to step 102 to scan the file system cell for inconsistency with a log of updates, and to repair any inconsistency that is found. Then execution returns.

As described above, one advantage of a meta file system is to reduce the time for recovery of a large user-visible file system. Another advantage of the meta file system is to permit multi-processor management of a file system by concurrently performing file system access operations in multiple file system cells of the meta file system.

Figure 8:
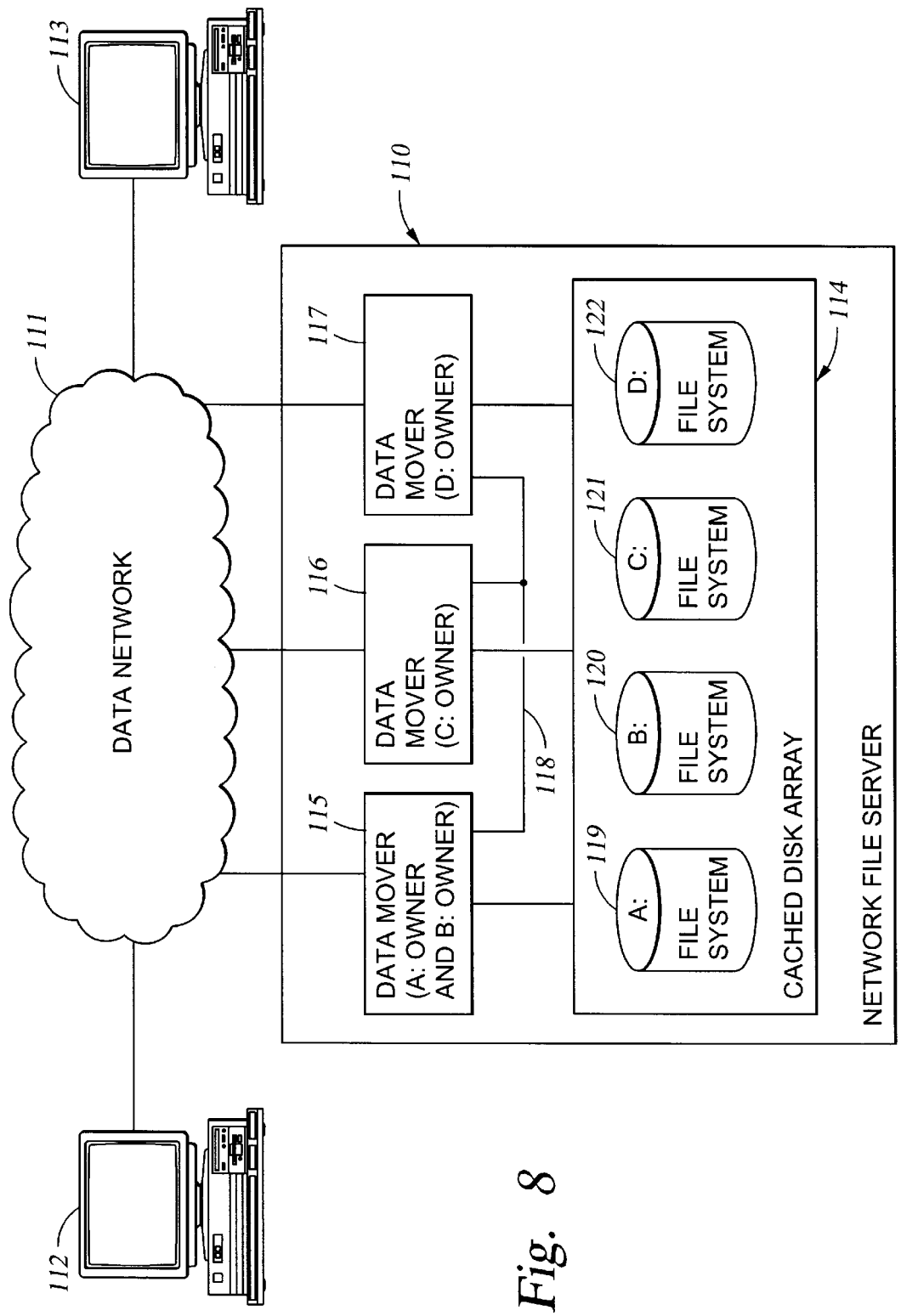
FIG. 8 is a block diagram of a data processing system including a network file server having a plurality of data mover computers, each of which manages a respective file system cell of the meta file system of FIG. 2.

With reference to FIG. 8, there is shown a block diagram of a data processing system including a network file server 110 having a plurality of data mover computers 115, 116, 117, each of which manages a respective file system cell of the meta file system of FIG. 2. The network file server 110 is connected by a data network 111 to a number of clients including work stations 112, 113. The data network 111 may include any one or more network connection technologies, such as Ethernet, and communication protocols, such as TCP/IP or UDP. The work stations 112, 113, for example, are personal computers.

The preferred construction and operation of the network file server 110 is further described in Vahalia et al., U.S. Pat. No. 5,893,140 issued Apr. 6, 1999, incorporated herein by reference. The network file server 110 includes a cached disk array 114. Such a network file server 110 is manufactured and sold by EMC Corporation, 35 Parkwood Dr., Hopkinton, Mass. 01748.

The network file server 110 is managed as a dedicated network appliance, integrated with popular network operating systems in a way, which, other than its superior performance, is transparent to the end user. The clustering of the data movers 115, 116, 117 as a front end to the cached disk array 114 provides parallelism and scalability. Each of the data movers 115, 116, 117 is a high-end commodity computer, providing the highest performance appropriate for a data mover at the lowest cost. The data movers may communicate with each other over a dedicated dual-redundant Ethernet connection 118. The data mover computers 115, 116, and 117 may communicate with the other network devices using standard file access protocols such as the Network File System (NFS) or the Common Internet File System (CIFS) protocols, but the data mover computers do not necessarily employ standard operating systems. For example, the network file server 110 is programmed with a Unix-based file system that has been adapted for rapid file access and streaming of data between the cached disk array 114 and the data network 111 by any one of the data mover computers 115, 116, 117.

The meta file system can be organized so that the file system cell named "A:" does not contain any user or application files. In this case, the file system cell named "A:" is essentially a repository for metadata of the user-visible file system, and information about the configuration of the meta file system. For example, the root directory of the file system cell named "A:" shows how objects in the user-visible root directory are apportioned among other file system cells containing user-visible files. In the example of FIG. 8, the file system cell "A:" is located in data storage 119 in the cached disk array 114, and each of the data movers 115, 116, 117 has shared read-write access to the file system cell "A:" in the data storage 119. Therefore, each of the data movers has non-blocking concurrent read-write access to the information needed for directing a file system access received by any of the data movers to the file system cells (B:, C:, and D:) containing user or application files. Morever, as shown in FIG. 8, the other file system cells (B:, C:, and D:) are also located in respective data storage 120, 121, 122 in the cached disk array 114. Each of the data movers 115, 116, 117 has read write access to each of the file system cells. However, the data mover 115 exclusively manages access to the file system cell "A:" and the file system "B:" (i.e., it is the "A: owner" and the "B: owner"), the data mover 116 exclusively manages access to the file system cell "C:" (i.e., it is the "C: owner"), and the data mover 117 exclusively manages access to the file system cell "D:" (i.e., it is the "D: owner").

Figure 9:
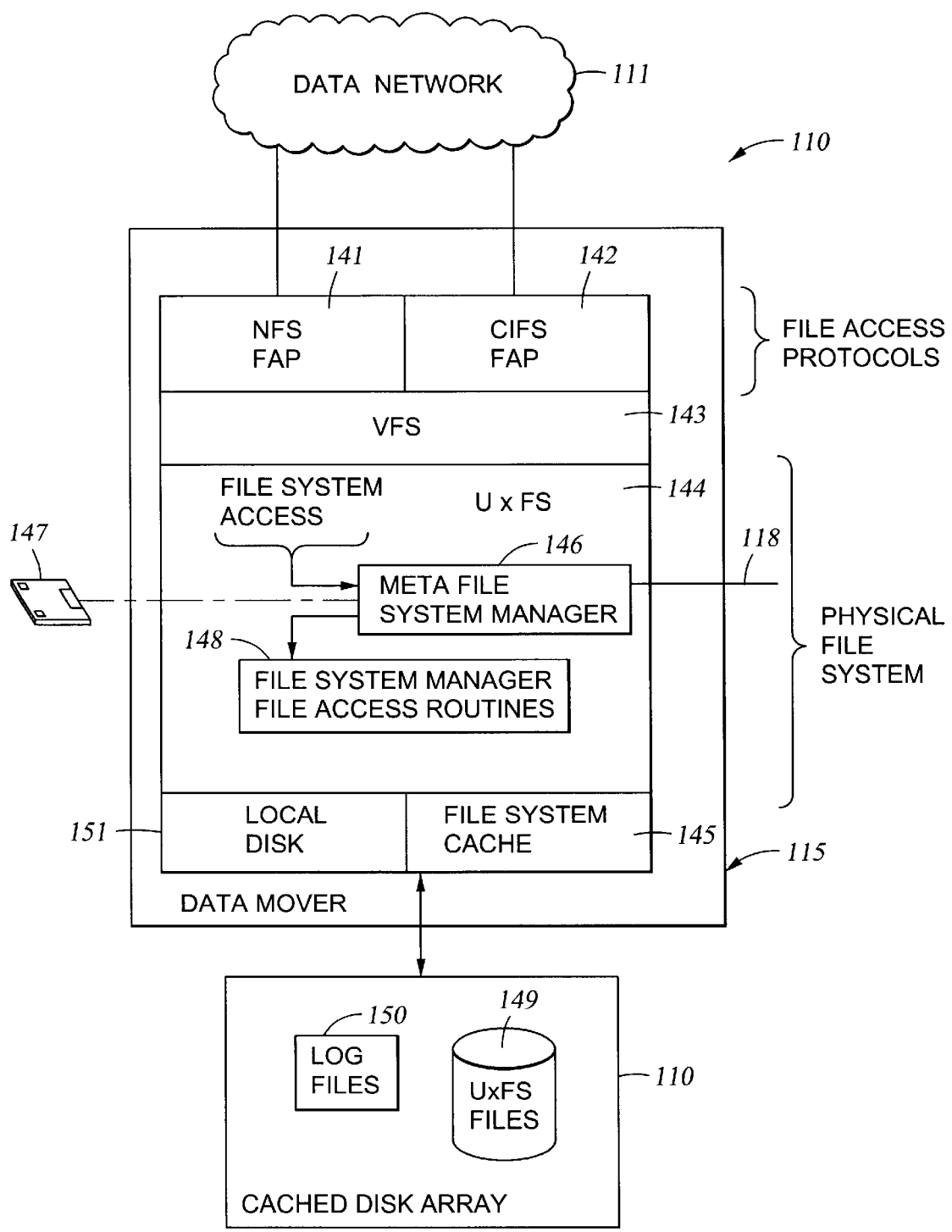
FIG. 9 is a partial view of the data network of FIG. 8, showing in detail one of the data mover computers in the network file server of FIG. 8.

Referring to FIG. 9, there is shown a block diagram of software structure that is replicated in each data mover 115. The software structure includes modules 141 and 142 for the Network File System (NFS) file access protocol (FAP) and the Common Internet File System (CIFS) file access protocol, a Virtual File System (VFS) 143, and a Unix-based file system (UxFS) 144. The Virtual File System (VFS), which is an industry-standard back-end file system switch, interfaces with the UxFS physical file system 144. VFS translates NFS Common File System requests. (The NFS Common File System Requests in themselves are translations of NFS requests to the intended physical file storage devices.) UxFS accesses a file system buffer cache 145 during data transfers between the data network 111 and disk storage 149 in the cached disk array. UxFS also writes updates to a log file 150 just before committing the updates to the UxFS files 149, for example, upon closing a file after a write operation.

In accordance with an aspect of the present invention, a Meta File System Manager 146 is integrated with the UxFS module 144. For example, the UxFS module 144, including the Meta File System Manager 146, is read from a machine readable program storage device such as a floppy disk 147, and loaded into local data storage 151 of the data mover 115. As introduced above with reference to FIG. 4, the Meta File System Manager 146 is invoked by file system access calls originally intended for the file system manager access routines 148 in the UxFS 144.

Figure 10:
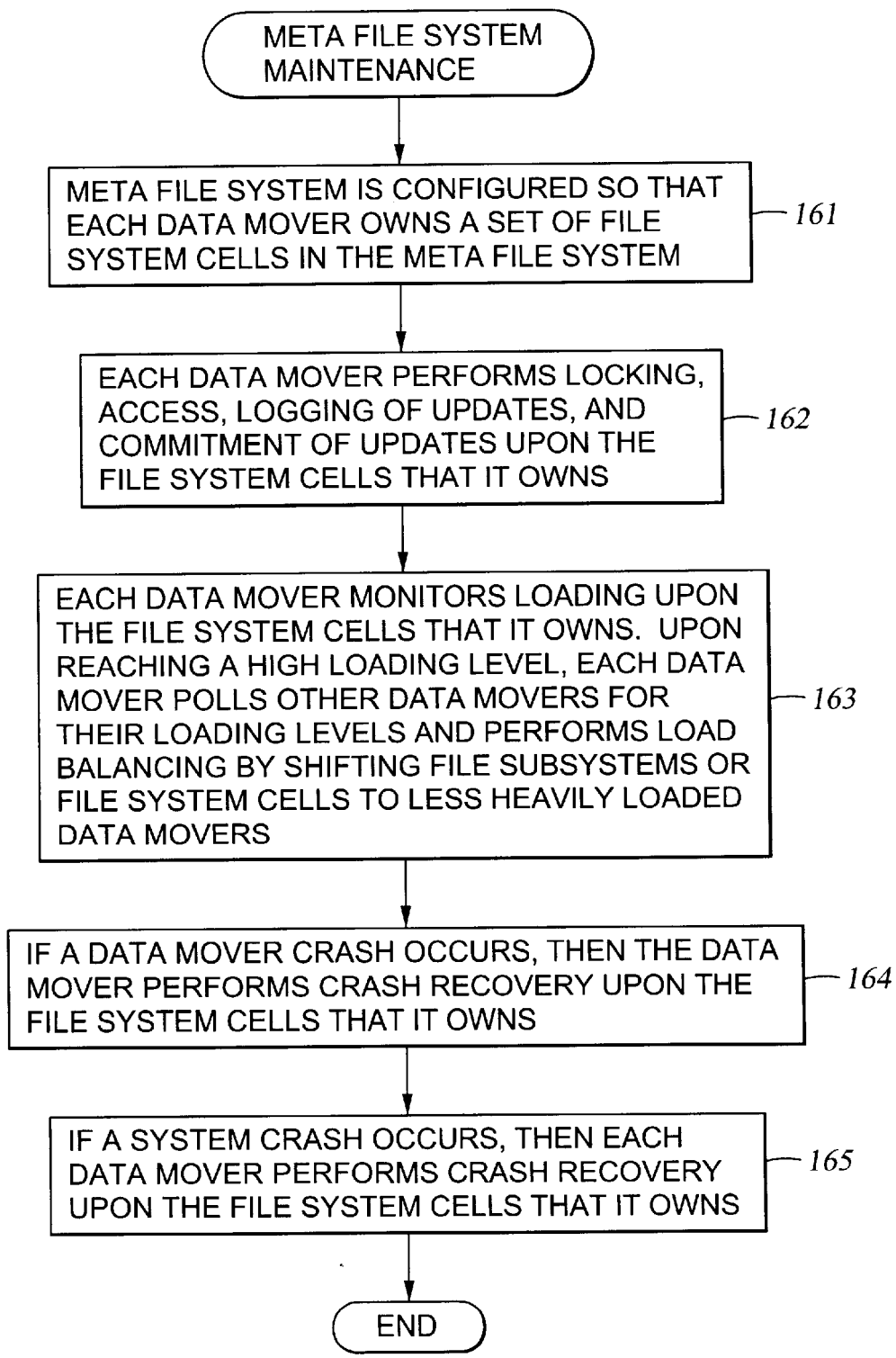
FIG. 10 is a flow chart showing how the data mover computers in the data processing system of FIG. 8 manage their respective cells in the meta file system of FIG. 2.

With reference to FIG. 10, there is shown a flow chart of a procedure by which the data mover computers in the data processing system of FIG. 8 manage their respective file system cells in the meta file system of FIG. 2. In a first step 161, the meta file system is configured so that each data mover owns a set of file system cells in the meta file system. Then in step 162, each data mover performs locking, access, logging of updates, and commitment of updates upon the file system cells that it owns. If a data mover receives from a network client a request for access to a meta file system object in a file system cell that the data mover does not own, then the data mover forwards the request to the data mover that owns the file subsystem cell, and also returns any reply to the network user having originated the request.

In an alternative mode of operation, a data mover that does not own a file system cell to be accessed sends a lock request to the data mover that owns the file system cell to be accessed, and the data mover that owns the file system cell to be accessed returns a grant of a lock on an object in the file system cell to be accessed. The data mover that does not own the file system cell to be accessed can then access the object directly in the cached disk array for satisfying the client's request, without passing object data through the data mover that owns the file system cell to be accessed. In this alternative arrangement, however, it is still preferred for the data mover that owns the file system cell to maintain and update the meta data for the objects in the file system cell that it owns. Once the access for the client is completed, the data mover not owning the file system cell sends a notification of a release of the lock to the data mover that owns the file system that is accesses.

In step 163, each data mover monitors loading upon the file system cells that it owns, and upon reaching a high loading level, the data mover polls other data movers for their loading levels. If a data mover having a sufficiently lower loading level is found, then load balancing is performed by shifting file subsystems or file system cells from the more heavily loaded data mover to the less heavily loaded data mover. A shifted file subsystem becomes a new file system cell in the meta file system. A shift of a file system cell is a change in data mover ownership of the file system cell. In either case, the shift is performed by adding or changing linkages in the meta file system hierarchy, and is essentially a change in pointers to file data. The file data itself need not be moved in the storage of the cached disk array.

In step 164, if a data mover crash occurs, then once the data mover having crashed is re-booted, it performs crash recovery upon the file system cells that it owns. In step 165, if a system crash occurs, then each data mover in the network file server performs crash recovery upon the file system cells that it owns. This completes the flowchart in FIG. 10 of the procedure for maintenance of the meta file system in the network file server in FIG. 8.

In view of the above, file system cells are linked together to form a meta file system that appears to a user or application program to be a single file system. Each file system cell may have a conventional file system format, and can be indistinguishable from a conventional file system except for information, such as directory entry attributes, indicating one or more external links to other file system cells. These external links may include direct links that are hidden from the user or application program and define a hierarchy of the meta file system cells, and indirect links that appear in the user-visible file system. Preferably the indirect links include a target specification that is the name of a path in the user-visible file system so that the target does not change during any reorganization of the meta file system. The meta file system substantially reduces crash recovery time because each file system cell functions as a consistency unit that can be repaired only if needed. The meta file system also permits the file system cells to be accessed concurrently by multiple processors in a file server. Each processor can be assigned exclusive management of a set of file system cells. As objects such as files are added to the file system cells, each processor can monitor loading upon its file system cells, and respond to a high loading condition by polling the other processors to find a less heavily loaded processor. If a less heavily loaded processor is found, the meta file system can be reorganized to perform load balancing by shifting the load from the more heavily loaded processor to the less heavily loaded processor.

What is claimed is:

1. A method comprising:

selecting a file subsystem in a first file system;

removing the selected file subsystem from the first file system, converting the selected file subsystem into a second file system, and inserting a link in the first file system from a directory entry for the selected file subsystem to a root directory of the second file system; and presenting the combination of the first file system and the second file system to a user or application program so that combination of the first file system and the second file system appears to the user or application program as one file system.

2. The method as claimed in claim 1, wherein the converting of the selected file subsystem into the second file system includes adding file system metadata to the selected file subsystem.

3. The method as claimed in claim 1, which includes creating a hierarchy of multiple file systems in such a way that the hierarchy appears to a user or application program as a single file system.

4. The method as claimed in claim 1, which includes hiding the link from view of a user or application program.

5. The method as claimed in claim 1, which includes providing the directory entry for the selected file subsystem with an attribute indicating that the entry is for an external link.

6. The method as claimed in claim 1, wherein the link is inserted by inserting a link file in the first file system, the link file including information for locating the second file system.

7. The method as claimed in claim 1, wherein the first file system includes a link between a portion of the first file system outside the selected file subsystem to the inside of the selected file subsystem, and the method further includes providing the link with a target specification that does not change when the method of claim 1 is repeated upon the first and second file systems.

8. The method as claimed in claim 1, wherein the first file system includes a link between a portion of the first file system outside the selected file subsystem to the inside of the selected file subsystem, and the method further includes providing a user or application with a view of objects in the first and second file systems that does not change from before and after performing the method of claim 1, and providing the link with a target specification which includes a name of a path in the view of objects in the first and second file systems that does not change from before and after performing the method of claim 1.

9. The method as claimed in claim 1, wherein the method includes accessing each of the first and second file systems by checking whether said each of the first and second file systems has an attribute indicating that the first file system has at least one external link to another file system, and when said each of the first and second file systems does not have an attribute indicating that the first file system has at least one external link to another file system, invoking at least one file system manager routine that does not recognize external links, and when said each file system does have an attribute indicating that the first file system has at least one external link to another file system, invoking at least one file system manager routine that recognizes external links.

10. The method as claimed in claim 1, which includes recovering from a system crash by checking whether each of the first and second file systems has a file system attribute indicating whether or not said each of the first and second file systems needs to be checked for consistency after the system crash.

11. The method of claim 1, which further includes operating a first processor to access the first file system to check the first file system for consistency after a system crash and concurrently operating a second processor to access the second file system to check the second file system for consistency after the system crash.

12. The method of claim 1, which further includes operating a first processor to manage user or application program access to the first file system and concurrently operating a second processor to manage user or application program access to the second file system.

13. The method of claim 12, wherein the selecting of the file subsystem is based on loading of the processors in order to balance loading upon the processors.

14. A collection of multiple file systems contained in data storage, the multiple file systems being linked in a hierarchy by direct links in the file systems, the direct links being hidden from a user or application program in such a way that the hierarchy appears to the user or application program as a single file system.

15. The collection of multiple file systems as claimed in claim 14, wherein the direct links include hidden files in the file systems, respective directory entries for the hidden files are included in the file systems and the respective directory entries for the hidden files each include an attribute indicating that the entry is for an external link.

16. The collection of multiple file systems as claimed in claim 14, wherein each file system that includes at least one direct link to another file system in the hierarchy also includes file system meta data including an attribute indicating that said each file system includes at least one direct link to another file system in the hierarchy.

17. The collection of multiple file systems as claimed in claim 14, wherein each direct link from a first file system in the collection of multiple file systems to a second file system in the collection of multiple file systems includes a link file in the first file system, and the link file contains information for locating the second file system.

18. The collection of multiple file systems as claimed in claim 14, further including at least one indirect link from a first file system in the collection of multiple file systems to a second file system in the collection of multiple file systems, the indirect link being visible to the user or application program, and the indirect link including a target specification that is a name of a path in said single file system visible to the user or application program.

19. A method of operating a network file server to provide users in the network with concurrent access to objects distributed over a plurality of file systems in data storage of the network file server, the network file server having a plurality of data mover computers for responding to users requesting access to the data storage, the method comprising:

(a) configuring the data mover computers so that each data mover computer has exclusive management of access to a respective subset of the file systems; and (b) when each data mover computer receives a user request for access to an object in one of the file systems, said each data mover computer directs the request to the data mover computer that has exclusive management of access to said one of the file systems;

wherein the file systems are linked in a hierarchy and said each data mover computer accesses a hidden root directory in the hierarchy of file system in order to direct the request to the data mover computer that has exclusive management of access to a respective one of the plurality of file systems containing the object.

20. The method as claimed in claim 19, wherein the hidden root directory is contained in a file system that is replicated in each of the data mover computers.

21. A method of operating a network file server to provide users in the network with concurrent access to objects distributed over a plurality of file systems in data storage of the network file server, the network file server having a plurality of data mover computers for responding to users requesting access to the data storage, the method comprising:

(a) configuring the data mover computers so that each data mover computer has exclusive management of access to a respective subset of the file systems; and (b) when each data mover computer receives a user request for access to an object in one of the file systems, said each data mover computer directs the request to the data mover computer that has exclusive management of access to said one of the file systems;

wherein after a system crash, each data mover performs a consistency check upon the file systems in said each data mover's respective subset of file systems.

22. A method of operating a network file server to provide users in the network with concurrent access to objects distributed over a plurality of file systems in data storage of the network file server, the network file server having a plurality of data mover computers for responding to users requesting access to the data storage, the method comprising:

(a) configuring the data mover computers so that each data mover computer has exclusive management of access to a respective subset of the file systems; and (b) when each data mover computer receives a user request for access to an object in one of the file systems, said each data mover computer directs the request to the data mover computer that has exclusive management of access to said one of the file systems;

which further includes load balancing upon the data movers by reconfiguring the file systems in order to move objects from file systems managed by more heavily loaded data movers to file systems managed by less heavily loaded data movers.

23. The method as claimed in claim 22, wherein each data mover computer monitors loading upon said each data mover to determine whether said each data mover computer is heavily loaded, and upon determining that said each data mover computer is heavily loaded, said each data mover computer polls other data mover computers to search for a less heavily loaded data mover computer.

24. The method as claimed in claim 22, wherein the objects are moved by shifting file subsystems.

25. The method as claimed in claim 24, wherein file subsystems are shifted by removing the a selected file subsystem from a first file system, converting the selected file subsystem into a second file system, and inserting a link in the first file system from a directory entry for the selected file subsystem to a root directory of the second file system.

26. A method of operating a network file server to provide users in the network with concurrent access to objects distributed over a plurality of file systems in data storage of the network file server, the network file server having a plurality of data mover computers for responding to users requesting access to the data storage, the method comprising:

(a) configuring the data mover computers so that each data mover computer has exclusive management of access to a respective subset of the file systems; and (b) when each data mover computer receives a user request for access to an object in one of the file systems, said each data mover computer directs the request to the data mover computer that has exclusive management of access to said one of the file systems;

which further includes load balancing upon the data movers by moving ownership of file systems from more heavily loaded data movers to less heavily loaded data movers.

27. A network file server comprising:

data storage; and a plurality of data mover computers adapted for coupling to a data network and coupled to the data storage to provide users in the network with concurrent access to objects distributed over a plurality of file systems in the data storage of the network file server;

wherein the data mover computers are configured so that each data mover computer has exclusive management of access to a respective subset of the file systems; and each data mover computer is programmed to receive a user request for access to an object in one of the file systems, and directs the request to the data mover computer that has exclusive management of access to said one of the file systems; and wherein the file systems are linked in a hierarchy and said each data mover computer is programmed to access a hidden root directory in the hierarchy of file systems in order to direct the request to the data mover computer that has exclusive management of access to a respective one of the plurality of file systems containing the object.

28. The network file server as claimed in claim 27, wherein the hidden root directory is contained in a file system that is replicated in each of the data mover computers.

29. The network file server as claimed in claim 28, wherein the file system containing the hidden root directory contains no user-visible objects.

30. A network file server comprising:

data storage; and a plurality of data mover computers adapted for coupling to a data network and coupled to the data storage to provide users in the network with concurrent access to objects distributed over a plurality of file systems in the data storage of the network file server;

wherein the data mover computers are configured so that each data mover computer has exclusive management of access to a respective subset of the file systems; and each data mover computer is programmed to receive a user request for access to an object in one of the file systems, and directs the request to the data mover computer that has exclusive management of access to said one of the file systems containing the object;

wherein each data mover is programmed to recover from a system crash by performing a consistency check upon the file systems in said each data mover's respective subset of file systems.

31. A network file server comprising:

data storage; and a plurality of data mover computers adapted for coupling to a data network and coupled to the data storage to provide users in the network with concurrent access to objects distributed over a plurality of file systems in the data storage of the network file server;

wherein the data mover computers are configured so that each data mover computer has exclusive management of access to a respective subset of the file systems; and each data mover computer is programmed to receive a user request for access to an object in one of the file systems, and directs the request to the data mover computer that has exclusive management of access to said one of the file systems containing the object;

wherein the data movers are programmed for load balancing by reconfiguring the file systems in order to move objects from file systems managed by more heavily loaded data movers to file systems managed by less heavily loaded data movers.

32. The network file server as claimed in claim 31, wherein each data mover computer is programmed for monitoring loading upon said each data mover to determine whether said each data mover computer is heavily loaded, and upon determining that said each data mover computer is heavily loaded, said each data mover computer polls other data mover computers to search for a less heavily loaded data mover computer.

33. The network file server as claimed in claim 31, wherein each data mover computer is programmed to move objects by shifting file subsystems.

34. The network file server as claimed in claim 33, wherein each data mover computer is programmed to shift file subsystems by removing the selected file subsystem from a first file system, converting the selected file subsystem into a second file system, and inserting a link in the first file system from a directory entry for the selected file subsystem to a root directory of the second file system.

35. A network file server comprising:

data storage; and a plurality of data mover computers adapted for coupling to a data network and coupled to the data storage to provide users in the network with concurrent access to objects distributed over a plurality of file systems in the data storage of the network file server;

wherein the data mover computers are configured so that each data mover computer has exclusive management of access to a respective subset of the file systems; and each data mover computer is programmed to receive a user request for access to an object in one of the file systems, and directs the request to the data mover computer that has exclusive management of access to said one of the file systems containing the object; and wherein the data movers are programmed for load balancing by changing ownership of file systems from more heavily loaded data movers to less heavily loaded data movers.

36. A program storage device containing a program executable by a network file server, the network file server being adapted for coupling to at least one client for access of the client to a user-visible file system in storage in the network file server, objects in the user-visible file system being contained in a plurality of file systems, said program including a manager of the user-visible file system for receiving file system access calls intended for a file system manager, and the manager of the user-visible file system being executable for acting as an intermediary between the client and said file system manager in order to follow hidden links between the plurality of file systems so that the plurality of file systems appear to the client as one file system.

37. A program storage device containing a program executable by a network file server, the network file server being adapted for coupling to at least one client for access of the client to a user-visible file system in storage in the network file server, objects in the user-visible file system being contained in a plurality of file systems, said program including a manager of the user-visible file system for receiving file system access calls intended for a file system manager, and the manager of the user-visible file system being executable for acting as an intermediary between the client and said file system manager in order to follow hidden links between the plurality of file systems, wherein the manager of the user-visible file system is executable for accessing each of said plurality of file systems by checking whether said each of said plurality of file systems has an attribute indicating that said each of said plurality of file systems has external links, and when said each of said plurality of file systems does not have an attribute indicating that said each of said plurality of file systems has external links, calling at least one routine of the manager of the user-visible file system that does not recognize external links, and when said each of said plurality of file systems does have an attribute indicating that said each of said plurality of file systems has external links, executing at least one routine of the manager of the user-visible file system that recognizes external links.

38. The program storage device as claimed in claim 37, wherein the manager of the user-visible file system is executable to recover from a system crash by checking whether said each of said plurality of file systems has a file system attribute indicating whether or not said each of said plurality of file systems needs to be checked for consistency after the system crash.

39. A method comprising:

selecting a file subsystem in a first file system; and removing the selected file subsystem from the first file system, converting the selected file subsystem into a second file system, and inserting a link in the first file system from a directory entry for the selected file subsystem to a root directory of the second file system;

wherein the link is a hidden file including information for locating the second file system.

40. The method as claimed in claim 39, wherein the method includes accessing each file system by checking whether said each file system has an attribute indicating that the first file system has at least one external link to another file system, and when said each file system does not have an attribute indicating that the first file system has at least one external link to another file system, invoking at least one file system manager routine that does not recognize external links, and when said each file system does have an attribute indicating that the first file system has at least one external link to another file system, invoking at least one file system manager routine that recognizes external links.

41. A method comprising:

selecting a file subsystem in a first file system;

removing the selected file subsystem from the first file system, converting the selected file subsystem into a second file system, and inserting a link in the first file system from a directory entry for the selected file subsystem to a root directory of the second file system; and recovering from a system crash by checking whether each file system has a file system attribute indicating whether or not said each file system needs to be checked for consistency after the system crash.

42. A method comprising:

selecting a file subsystem in a first file system;

removing the selected file subsystem from the first file system, converting the selected file subsystem into a second file system, and inserting a link in the first file system from a directory entry for the selected file subsystem to a root directory of the second file system; and operating a first processor to access the first file system to check the first file system for consistency after a system crash and concurrently operating a second processor to access the second file system to check the second file system for consistency after the system crash.

43. A method comprising:

selecting a file subsystem in a first file system;

removing the selected file subsystem from the first file system, converting the selected file subsystem into a second file system, and inserting a link in the first file system from a directory entry for the selected file subsystem to a root directory of the second file system; and operating a first processor to manage user or application program access to the first file system and concurrently operating a second processor to manage user or application program access to the second file system.

44. The method of claim 43, wherein the selecting of the file subsystem is based on loading of the processors in order to balance loading upon the processors.

* * * * *

UNITED STATES PATENT AND TRADEMARK OFFICE
CERTIFICATE OF CORRECTION

PATENT NO. : 6,775,679 B2
DATED : August 10, 2004
INVENTOR(S) : Uday K. Gupta

It is certified that error appears in the above-identified patent and that said Letters Patent is hereby corrected as shown below:

Column 13,
Line 37, "the a" is changed to -- a --.

Signed and Sealed this

Nineteenth Day of October, 2004

JON W. DUDAS
*Director of the United States Patent and Trademark Office*